US011314760B2

(12) United States Patent
Venkata et al.

(10) Patent No.: US 11,314,760 B2
(45) Date of Patent: Apr. 26, 2022

(54) UPLOADING EXTERNAL FILES AND ASSOCIATING THEM WITH EXISTING DATA MODELS

(71) Applicant: ORACLE INTERNATIONAL CORPORATION, Redwood Shores, CA (US)

(72) Inventors: Ananth Venkata, Pleasanton, CA (US); Ashish Mittal, Redwood Shores, CA (US); Venugopal Surendran, Cupertino, CA (US); Nikhil Surve, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 498 days.

(21) Appl. No.: 14/862,539

(22) Filed: Sep. 23, 2015

(65) Prior Publication Data

US 2016/0085808 A1 Mar. 24, 2016

Related U.S. Application Data

(60) Provisional application No. 62/054,682, filed on Sep. 24, 2014.

(51) Int. Cl.
*G06F 16/25* (2019.01)

(52) U.S. Cl.
CPC .................................. *G06F 16/25* (2019.01)

(58) Field of Classification Search
CPC ...................................................... G06F 16/25
See application file for complete search history.

(56) References Cited

U.S. PATENT DOCUMENTS 7,257,597 B1 * 8/2007 Pryce .................... G06F 16/214
2004/0172400 A1 * 9/2004 Zarom ............. G06F 16/90339
2004/0205458 A1 * 10/2004 Hwang .................. G06F 40/16 715/255
2005/0060342 A1 * 3/2005 Farag .................... G06F 16/252
2008/0086689 A1 * 4/2008 Berkley ........... G06F 17/30896 715/731
2011/0083167 A1 * 4/2011 Carpenter ................ G06F 8/36 726/4
2011/0191303 A1 * 8/2011 Kaufman ............... G06F 16/20 707/684
2014/0156643 A1 * 6/2014 Rais-Ghasem ..... G06F 16/9038 707/722
2015/0019216 A1 * 1/2015 Singh .................... G06F 16/248 704/235

(Continued)

*Primary Examiner* — Eliyah S. Harper
(74) *Attorney, Agent, or Firm* — Miller Nash LLP

(57) ABSTRACT

A computer-implemented method includes providing a fixed portion of a data model, uploading external files to an extended portion of the data model, matching at least some parts of the external files to the fixed portions of the data model, and using data from both the fixed and extended portions of the data model together. A computer-implemented method includes receiving a query from a user to a data model that includes a stored subject area portion and a stored extended subject area portion, accessing at least one storage to retrieve the subject area portion and the extended subject area portion, joining relevant portions of the subject area and extended subject area, extracting answers to the query from the joined portions, and reporting the answers to the user.

16 Claims, 18 Drawing Sheets

| City | Zip | Age Group | Income Group | Skills Group | Education Group | Household Size |
|---|---|---|---|---|---|---|
| Auckland | 64:2120 | 42 | 85 | Med | 7 | 4 |
| Barrieras | 55:40938 | 49 | 60 | Low | 6 | 6 |
| Brooklyn | 1:11203 | 43 | 110 | Med | 12 | 3 |
| | 1:11256 | 42 | 120 | High | 12 | 2 |
| Cordoba | 34:14021 | 35 | 90 | Med | 8 | 4 |
| | 52:69124 | 51 | 70 | Low | 6 | 7 |
| Heidelberg | 49:69124 | 47 | 120 | High | 15 | 3 |
| | 61:3084 | 42 | 100 | High | 8 | 4 |
| Los Angeles | 1:98079 | 40 | 135 | High | 15 | 3 |
| Nice | 33:06300 | 39 | 115 | High | 11 | 3 |
| Osaka | 81:5540023 | 56 | 90 | Med | 7 | 3 |
| Reading | 44:RG22 | 55 | 130 | High | 9 | 3 |
| Santa Barbara | 1:93103 | 41 | 115 | Med | 15 | 3 |
| Sapporo | 81:06000064 | 57 | 95 | Low | 7 | 3 |

44
44

(56) References Cited

U.S. PATENT DOCUMENTS

| | | | | |
|---|---|---|---|---|
| 2015/0134599 | A1* | 5/2015 | Banerjee | G06F 16/2282 707/607 |
| 2015/0331912 | A1* | 11/2015 | P | G06F 16/24537 707/714 |
| 2016/0103912 | A1* | 4/2016 | Daggett | G16H 50/70 707/736 |
| 2017/0235848 | A1* | 8/2017 | Van Dusen | G06F 30/20 705/12 |

* cited by examiner

Confirmation

Interpreted User Metadata

Load 81 rows from North America Targets.xisx

Match with columns in subject area: A - Samples Sales

| ✓ Sales Rep Name | ✓ Brand | ✓ Quarter | ✓ Target Revenue |
|---|---|---|---|
| Fred Webster | Biztech | 2010 Q4 | 4906.84 |
| Fred Webster | FunPod | 2010 Q4 | 38515.72 |
| Roger Wray | Biztech | 2010 Q4 | 144558.92 |
| Roger Wray | FunPod | 2010 Q4 | 22780.87 |
| Roger Wray | HomeView | 2010 Q4 | 25891.13 |
| Aurelio Miranda | Biztech | 2010 Q4 | 42977.07 |
| Match with | Add Attribute | Match with | Add Measure |
| E1 Sales Rep Name | | T03 Qtr | Sum |

| City | Zip | Age Group | Income Group | Skills Group | Education Group | Household Size |
|---|---|---|---|---|---|---|
| Auckland | 64:2120 | 42 | 85 | Med | 7 | 4 |
| Barrieras | 55:40938 | 49 | 60 | Low | 6 | 6 |
| Brooklyn | 1:11203 | 43 | 110 | Med | 12 | 3 |
| | 1:11256 | 42 | 120 | High | 12 | 2 |
| Cordoba | 34:14021 | 35 | 90 | Med | 8 | 4 |
| | 52:69124 | 51 | 70 | Low | 6 | 7 |
| Heidelberg | 49:69124 | 47 | 120 | High | 15 | 3 |
| | 61:3084 | 42 | 100 | High | 8 | 4 |
| Los Angeles | 1:98079 | 40 | 135 | High | 15 | 3 |
| Nice | 33:06300 | 39 | 115 | High | 11 | 3 |
| Osaka | 81:5540023 | 56 | 90 | Med | 7 | 3 |
| Reading | 44:RG22 | 55 | 130 | High | 9 | 3 |
| Santa Barbara | 1:93103 | 41 | 115 | Med | 15 | 3 |
| Sapporo | 81:06000064 | 57 | 95 | Low | 7 | 3 |

| SA Country | SA City | Age Group | Income Group | Skills Group | Education Group | Household Size |
|---|---|---|---|---|---|---|
| Australia | Heidelberg | 42 | 100 | High | 8 | 4 |
| Brazil | Barrieras | 49 | 60 | Low | 6 | 6 |
| France | Nice | 39 | 115 | High | 11 | 3 |
| Germany | Heidelberg | 47 | 120 | High | 15 | 3 |
| Japan | Osaka | 56 | 90 | Med | 7 | 3 |
| | Sapporo | 57 | 95 | Low | 7 | 3 |
| Mexico | Cordoba | 51 | 70 | Low | 6 | 7 |
| New Zealand | Auckland | 42 | 85 | Med | 7 | 4 |
| Spain | Cordoba | 35 | 90 | Med | 8 | 4 |
| USA | Brooklyn | 43 | 110 | Med | 12 | 3 |
| | Los Angeles | 40 | 135 | High | 15 | 3 |
| United Kingdom | Reading | 55 | 130 | High | 9 | 3 |
| | | 41 | 115 | Med | 15 | 3 |
| | | 42 | 120 | High | 12 | 2 |

| SA City | SA Zip | Zip | City ▲▽ | Age Group | Income Group | Skills Group | Education Group | House Size | Revenue |
|---|---|---|---|---|---|---|---|---|---|
| Auckland | 64:2120 | 64:2120 | Auckland | 42 | 85 | Med | 7 | 4 | $365,454 |
| Barrieras | 55:40938 | 55:40938 | Barrieras | 49 | 60 | Low | 6 | 6 | $544,757 |
| Brooklyn | 1:11203 | 1:11203 | | 43 | 110 | Med | 12 | 3 | $475,676 |
| Cordoba | 34:14021 | 34:14021 | Cordoba | 35 | 90 | Med | 8 | 4 | $421,957 |
| | 52:69124 | 52:69124 | | 51 | 70 | Low | 6 | 7 | $167,796 |
| Heidelberg | 49:69124 | 49:69124 | Heidelberg | 47 | 120 | High | 15 | 3 | $435,985 |
| | 61:3084 | 61:3084 | | 42 | 100 | High | 8 | 4 | $377,986 |
| Los Angeles | 1:98079 | 1:98079 | Los Angeles | 40 | 135 | High | 15 | 3 | $487,587 |
| Nice | 33:09300 | 33:09300 | Nice | 39 | 115 | High | 11 | 3 | $648,354 |
| Osaka | 81:5540023 | 81:5540023 | Osaka | 56 | 90 | Med | 7 | 3 | $247,907 |
| Reading | 44:RG22 | 44:RG22 | Reading | 55 | 130 | High | 9 | 3 | $424,619 |
| Sapporo | 81:06000064 | 81:06000064 | Sapporo | 57 | 95 | Low | 7 | 3 | $694,426 |

| Country | Capital | Language | Currency | Population | Area |
|---|---|---|---|---|---|
| Algeria | Algiers | Arabic | Dinar | 35,406,303 | 2,381,741 |
| Australia | Canberra | English | AU Dollar | 21,015,576 | 7,617,931 |
| Belgium | Brussels | French | Euro | 10,438,353 | 30,230 |
| Brazil | Brazilia | Portuguese | Real | 205,715,890 | 8,456,511 |
| Canada | Ottawa | English | CN Dollar | 34,300,083 | 9,093,507 |
| France | Paris | French | Euro | 65,951,611 | 545,630 |
| Germany | Berlin | German | Euro | 81,305,856 | 350,261 |
| Honduras | Tegucigalpa | Spanish | Lempira | 8,296,693 | 111,891 |
| Italy | Rome | Italian | Euro | 61,261,254 | 294,019 |
| Japan | Tokyo | Japanese | Yen | 127,368,008 | 364,485 |
| Mexico | Mexico City | Spanish | MX Peso | 112,468,855 | 1,923,039 |
| Morocco | Rabat | Arabic | Dirham | 31,627,428 | 446,301 |
| New Zealand | Wellington | English | NZ Dollar | 4,252,277 | 268,671 |
| Portugal | Lisbon | Portuguese | Euro | 10,781,459 | 91,639 |
| South Africa | Pretoria | IsiZulu | Rand | 48,810,427 | 1,219,912 |
| Spain | Madrid | Spanish | Euro | 47,042,984 | 499,401 |
| USA | Washington DC | English | US Dollar | 313,847,465 | 9,166,601 |
| United Kingdom | London | English | Sterling | 63,047,162 | 241,590 |

| Region | Country | Capital | Language | Currency | Population | Area |
|---|---|---|---|---|---|---|
| APAC | Australia | Canberra | English | AU Dollar | 21,015,576 | 7,617,931 |
| | Japan | Tokyo | Japanese | Yen | 127,368,008 | 364,485 |
| | New Zealand | Wellington | English | NZ Dollar | 4,252,277 | 268,671 |
| Americas | Brazil | Brazilia | Portuguese | Real | 205,716,890 | 8,456,511 |
| | Mexico | Mexico City | Spanish | MX Peso | 112,468,855 | 1,923,039 |
| | USA | Washington DC | English | US Dollar | 313,847,465 | 9,166,601 |
| EMEA | France | Paris | French | Euro | 65,951,611 | 545,630 |
| | Germany | Berlin | German | Euro | 81,305,856 | 350,261 |
| | Spain | Madrid | Spanish | Euro | 47,042,984 | 499,401 |
| | United Kingdom | London | English | Sterling | 63,047,162 | 241,590 |
| | Algeria | Algiers | Arabic | Dinar | 35,406,303 | 2,381,741 |
| | Belgium | Brussels | French | Euro | 10,438,353 | 30,230 |
| | Canada | Ottawa | English | CN Dollar | 34,300,083 | 9,093,507 |
| | Honduras | Tegucigalpa | Spanish | Lempira | 8,296,693 | 111,891 |
| | Italy | Rome | Italian | Euro | 61,261,254 | 294,019 |
| | Morocco | Rabat | Arabic | Dirham | 31,627,428 | 446,301 |
| | Portugal | Lisbon | Portuguese | Euro | 10,781,459 | 91,639 |
| | South Africa | Pretoria | IsiZulu | Rand | 48,810,427 | 1,219,912 |

| Region | Country | Capital | Language | Currency | Population | Area |
|---|---|---|---|---|---|---|
| APAC | Australia | Canberra | English | AU Dollar | 21,015,576 | 7,617,931 |
| | Japan | Tokyo | Japanese | Yen | 127,368,008 | 364,485 |
| | New Zealand | | | | | |
| Americas | Brazil | Brazilia | Portuguese | Real | 205,715,890 | 8,456,511 |
| | Mexico | | | | | |
| | USA | Washington DC | English | US Dollar | 313,847,465 | 9,166,601 |
| EMEA | France | Paris | French | Euro | 65,951,611 | 545,630 |
| | Germany | Berlin | German | Euro | 81,305,856 | 350,261 |
| | Spain | Madrid | Spanish | Euro | 47,042,984 | 499,401 |
| | United Kingdom | London | English | Sterling | 63,047,162 | 241,590 |
| | Portugal | Lisbon | Portuguese | Euro | 10,781,459 | 91,639 |

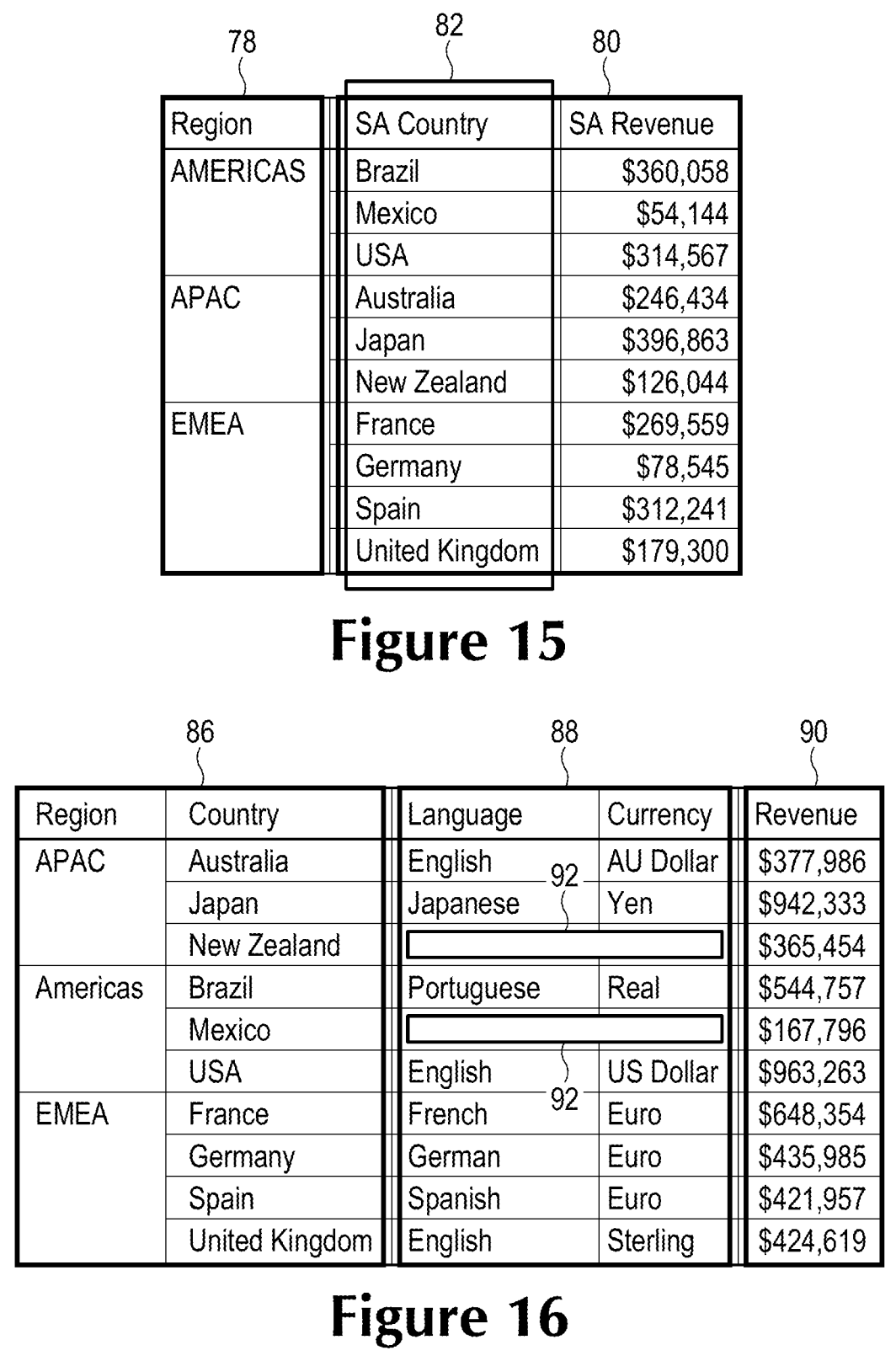

| Region | SA Country | SA Revenue |
|---|---|---|
| AMERICAS | Brazil | $360,058 |
| | Mexico | $54,144 |
| | USA | $314,567 |
| APAC | Australia | $246,434 |
| | Japan | $396,863 |
| | New Zealand | $126,044 |
| EMEA | France | $269,559 |
| | Germany | $78,545 |
| | Spain | $312,241 |
| | United Kingdom | $179,300 |

Figure 15

| Region | Country | Language | Currency | Revenue |
|---|---|---|---|---|
| APAC | Australia | English | AU Dollar | $377,986 |
| | Japan | Japanese | Yen | $942,333 |
| | New Zealand | | | $365,454 |
| Americas | Brazil | Portuguese | Real | $544,757 |
| | Mexico | | | $167,796 |
| | USA | English | US Dollar | $963,263 |
| EMEA | France | French | Euro | $648,354 |
| | Germany | German | Euro | $435,985 |
| | Spain | Spanish | Euro | $421,957 |
| | United Kingdom | English | Sterling | $424,619 |

Figure 16

| Cal YQ | Revenue | Target | Variance |
|---|---|---|---|
| 2012 Q1 | $812,511 | $781,732 | $30,779 |
| 2012 Q2 | $900,300 | $911,219 | -$10,919 |
| 2012 Q3 | $712,674 | $767,604 | -$54,930 |
| 2012 Q4 | $529,264 | $612,330 | -$83,066 |
| 2013 Q1 | $722,482 | $863,846 | -$141,364 |
| 2013 Q2 | $523,693 | $666,430 | -$142,737 |
| 2013 Q3 | $711,391 | $628,112 | $83,279 |
| 2013 Q4 | $380,189 | $434,862 | -$54,673 |

| Year | LOB | Revenue | Target △▽ | Variance |
|---|---|---|---|---|
| 2012 | AV | 1,552,084 | $1,658,317 | -$105,933 |
| | Books | $1,402,665 | $1,414,868 | -$12,203 |
| 2013 | AV | $838,319 | $1,100,001 | -$261,682 |
| | Books | $1,499,436 | $1,493,249 | $6,187 |

Figure 17

| Rep Name | Family | Cal YQ | Revenue | Target |
|---|---|---|---|---|
| Fernando Rio | Books | 2013 Q1 | $108,180 | 145,520 |
| | Music | 2012 Q1 | $54,580 | |
| | | 2012 Q2 | $237,987 | 147,532 |
| | | 2012 Q4 | $28,938 | 34,726 |
| | | 2013 Q2 | $17,745 | 23,069 |
| | | 2013 Q4 | $14,934 | 14,934 |
| | Videos | 2012 Q2 | $95,028 | 104,531 |
| | | 2012 Q3 | $28,368 | 19,858 |
| | | 2013 Q1 | $91,858 | 64,301 |
| | | 2013 Q4 | $18,684 | 26,158 |
| Nina Swartz | Music | 2013 Q2 | | 100,000 |
| | Videos | 2012 Q2 | $277,700 | 361,010 |
| | | 2012 Q3 | | 50,000 |
| | | 2012 Q4 | | 60,000 |
| | | 2013 Q1 | | 70,000 |

| 118 | | | | 120 | | | 122 | 124 | | | 126 | 128 | | |
|---|---|---|---|---|---|---|---|---|---|---|---|---|---|---|
| Year | Region | Family | Revenue | Val | Like | Promo | Revenue | Val | Like | Promo | Revenue | Val | Like | Promo |
| 2012 | APAC | Books | $18,788 | 3 | 5 | 3 | $203,805 | 14 | 12 | 14 | | | | |
| | | Music | $155,574 | 8 | 4 | 5 | $108,156 | 4 | 6 | 5 | $142,270 | 11 | 7 | 7 |
| | | Videos | $129,547 | 7 | 4 | 3 | | | | | $158,292 | 6 | 6 | 3 |
| | Americas | Books | $113,652 | 5 | 2 | 2 | $117,260 | 9 | 4 | 3 | $42,373 | 8 | 7 | 5 |
| | | Music | | | | | $149,140 | 7 | 5 | 4 | $196,906 | 11 | 8 | 6 |
| | | Videos | $327,716 | 4 | 3 | 3 | | | | | | | | |
| | EMEA | Books | $98,293 | 2 | 5 | 6 | $145,558 | 10 | 8 | 10 | $30,042 | 2 | 1 | 2 |
| | | Music | $99,753 | 7 | 6 | 6 | $103,748 | 12 | 7 | 5 | $177,126 | 12 | 11 | 11 |
| | | Videos | $182,277 | 4 | 7 | 3 | $127,825 | 8 | 4 | 5 | $126,698 | 9 | 3 | 5 |
| 2013 | APAC | Books | $58,993 | 9 | 3 | 4 | $33,510 | 5 | 5 | 4 | $183,764 | 17 | 15 | 18 |
| | | Music | $64,106 | 5 | 7 | 7 | | | | | $128,309 | 14 | 13 | 11 |
| | | Videos | $197,198 | 26 | 21 | 22 | $32,427 | 12 | 13 | 14 | $71,034 | 22 | 17 | 17 |
| | Americas | Books | $113,405 | 13 | 10 | 9 | $153,651 | 13 | 9 | 11 | $97,904 | 9 | 7 | 5 |
| | | Music | $28,872 | 9 | 7 | 4 | $63,378 | 14 | 10 | 12 | $17,745 | 5 | 4 | 6 |
| | | Videos | $47,352 | 7 | 7 | 5 | $90,255 | 22 | 11 | 14 | $116,207 | 17 | 10 | 9 |
| | EMEA | Books | $69,022 | 14 | 12 | 13 | $83,979 | 17 | 12 | 7 | $80,262 | 6 | 3 | 3 |
| | | Music | $16,590 | 5 | 7 | 5 | | | | | $90,161 | 17 | 17 | 17 |
| | | Videos | $60.847 | 16 | 9 | 9 | $91,953 | 14 | 10 | 11 | $346,831 | 40 | 36 | 28 |

Figure 19

| Cal YQ | Revenue | Of Value |
|---|---|---|
| 2012 Q1 | $812,511 | 8 |
| 2012 Q2 | $900,300 | 10 |
| 2012 Q3 | $712,674 | 6 |
| 2012 Q4 | $529,264 | 4 |
| 2013 Q1 | $722,482 | 10 |
| 2013 Q2 | $523,693 | 7 |
| 2013 Q3 | $711,391 | 10 |
| 2013 Q4 | $380,189 | 5 |

UPLOADING EXTERNAL FILES AND ASSOCIATING THEM WITH EXISTING DATA MODELS

CROSS REFERENCE TO RELATED APPLICATION

This application claims priority to and the benefit of U.S. Provisional Application No. 62/054,682, filed Sep. 24, 2014, which is incorporated herein in its entirety.

BACKGROUND

Business intelligence (BI) systems often include databases and data warehouses as part of an overall data model. Users of these systems often want to include data that is not necessarily in the data model for running reports and analyses, but may reside in spreadsheets or other data files. In current systems, the ability to combine these types of data into a form usable by most business users does not exist.

It is possible in some systems to add in external files, such as Microsoft® Excel® spreadsheets. Typically this capability requires the use of administrator tools to create the data model that includes the files, or to insert the data source into the model. Other systems can upload the file as a data model through publishing tools, but generally does not provide integration with the semantic models used for queries and access to the data. Approaches also exist that allow uploading of the external file for defining a complete model in business intelligence systems, but the system users typically consist of sophisticated business analysts and may be limited to cloud-base services. These solutions will not work for most end-users.

BRIEF DESCRIPTION OF THE DRAWINGS

FIGS. 4-8 show embodiments of user interfaces for uploading external files into a data model.

FIGS. 9-16 show embodiments of query results in a data model that includes external files as dimension extensions.

FIG. 17-20 show embodiments of query results in a data model that includes external files as fact extensions.

DETAILED DESCRIPTION OF THE EMBODIMENTS

Figure 1:
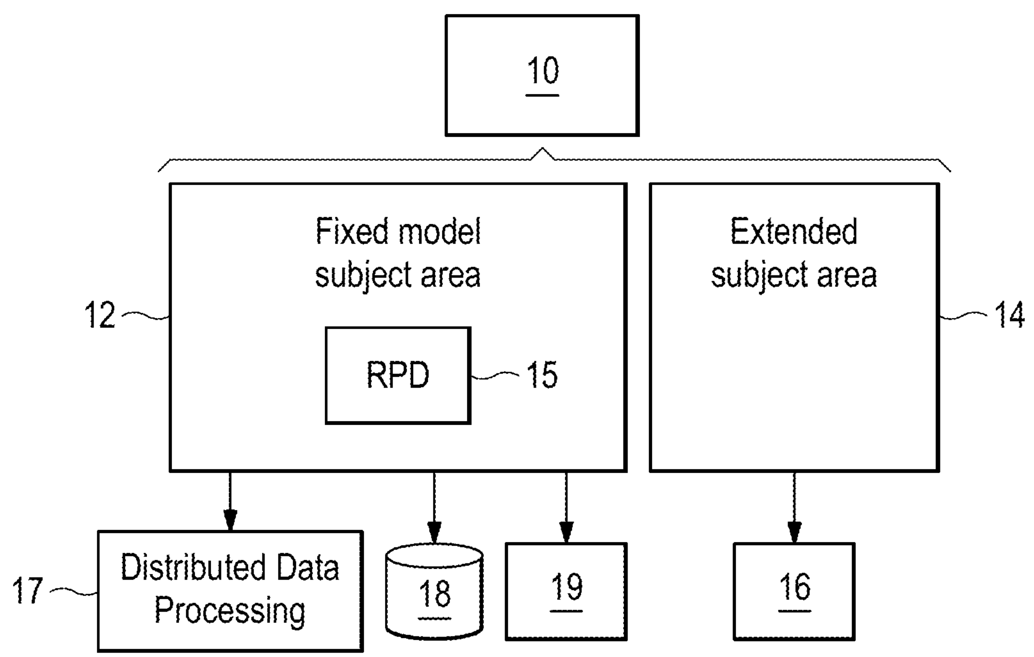
FIGS. 1 and 2 show a system having a data model that includes external files.
Figure 2:
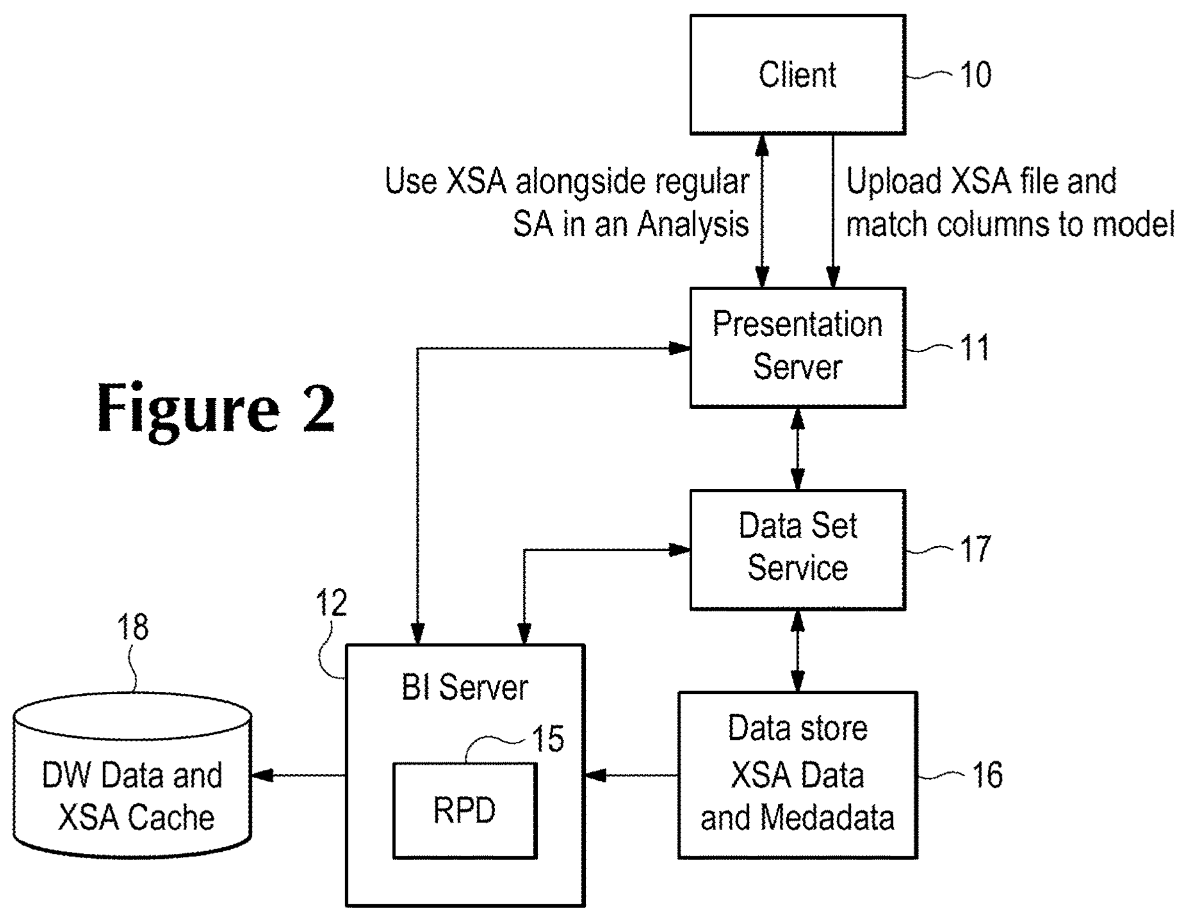

FIGS. 1 and 2 show embodiments of a system including a data model of both fixed subject areas (SA) and extended subject areas (XSA). In FIG. 1, the client system 10 provides a user access to a data model that includes a fixed model subject area 12. The client system 10, as well as the servers mentioned below may consist of one or more computing devices having a process for executing instructions that allow the processor to interact with the user through a user interface, operate on data retrieved from one or more storages and store results of those operations in the storage. The client system allows the user to access the data model. For example, the fixed model may include tables from a database or data warehouse related to products, customers and sales. The rpd file for the database may be used by distributed data processing tools and services 17, such as Hadoop, databases and data warehouses 18, and storage 19.

However, the user wants to include data related to surveys and demography of the customers, which are currently in spreadsheet form as extended subject areas 14. The user does not necessarily want to add this information into the fixed model, but wants to be able to perform analysis and run reports on this information combined with the information in the fixed model subject area. The XSA, in this case Excel® spreadsheets are stored in storage 16, which may or may not coincide with the storage 19.

FIG. 2 shows a more detailed view of the architecture. The client 10 uploads the XSA file to the presentation server 11. The process matches the columns in the XSA file to any columns in the data model that it can. The presentation server 17 communicates the information to the BI server 12 that has the Semantic Model (rpd file) 12 and the data set service such as Hadoop 17. The data set service 17 also provides access to the data store 16 for the XSA data and metadata related to the XSA data. The BI server provides access to the data warehouse data 18 and the XSA cache, which need not necessarily be in the data warehouse.

Figure 3:
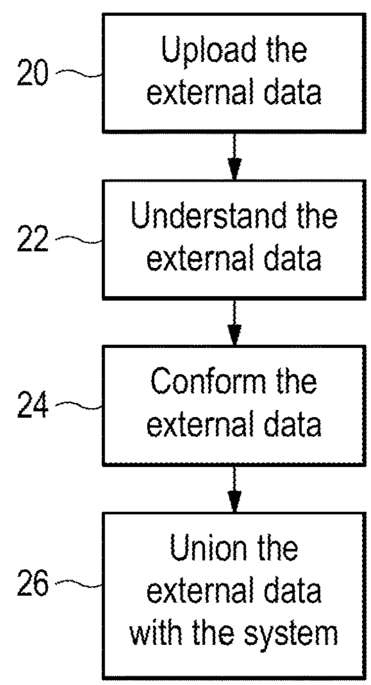
FIG. 3 shows a flowchart of an embodiment of a method to upload and use external files in a data model.
Figure 4:
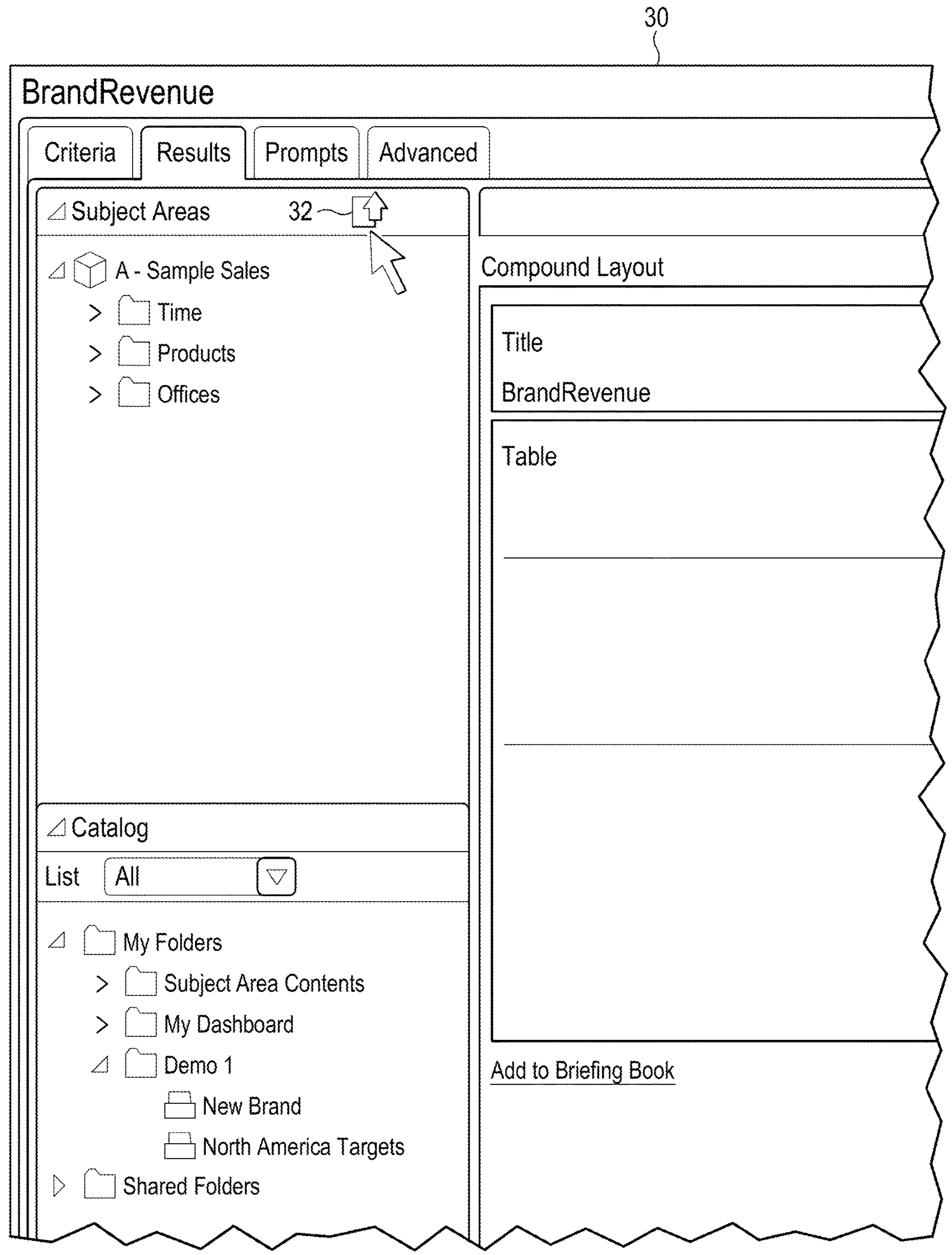

This system allows users to upload files external to the fixed model and allows for updating and storing that data as it changes. A flowchart of an overview of an embodiment of such a process is shown in FIG. 3. In FIG. 3, the system uploads the external data from a client system at 20. An example of a user interface that provides such a capability is shown in FIG. 4. The user interface 30 has an option 32 to upload external files.

Typically, the user will have several options in uploading and working with the files. The user can upload the file and provide the necessary metadata, discussed below, or the user can upload a file as a replacement file. The user can edit the metadata after it has been entered, upload a file into an existing catalog location, resulting in the file being appended to an existing file. The user may also have the capability to perform catalog operations such as delete, copy, move and export filed from the data catalog.

Returning to FIG. 3, once the file is uploaded the system then needs to understand the data at 22. No use is being made of the external subject matter at this point, so the queries may be to the XSA data only. One way to understand the external data is to query the external data dimension values and the data warehouse product dimension to see what matches. FIG. 5 shows an example of a user interface that allows the user to identify the metadata for the columns to allow the match between the SA and the XSA. The columns 34 will be matched, or 'conformed,' to columns in the SA. The brand and target revenue columns 36 represent the ability to add an attribute, the brand, and to add a measure, the target revenue, to the XSA.

Figure 6:
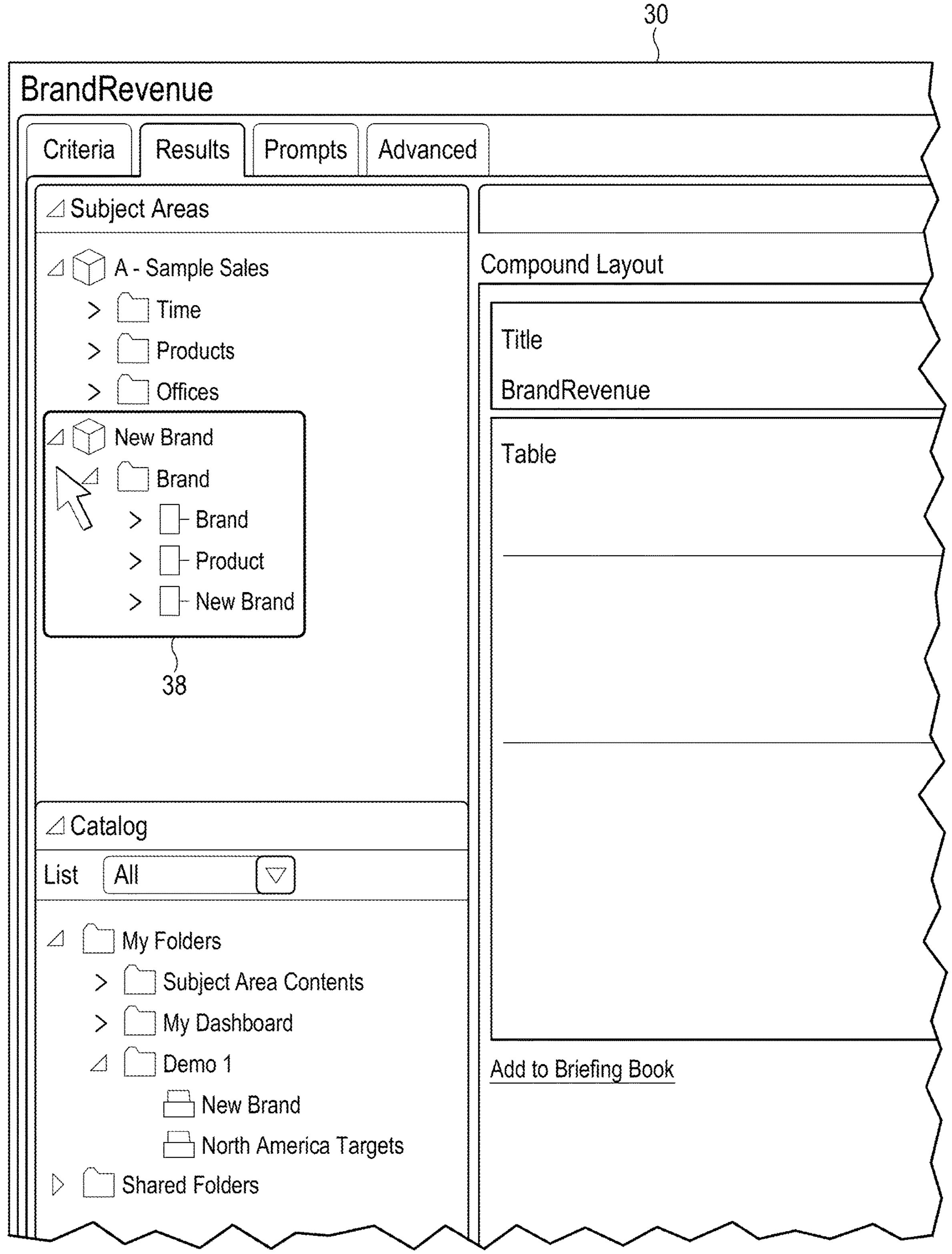
Figure 7:
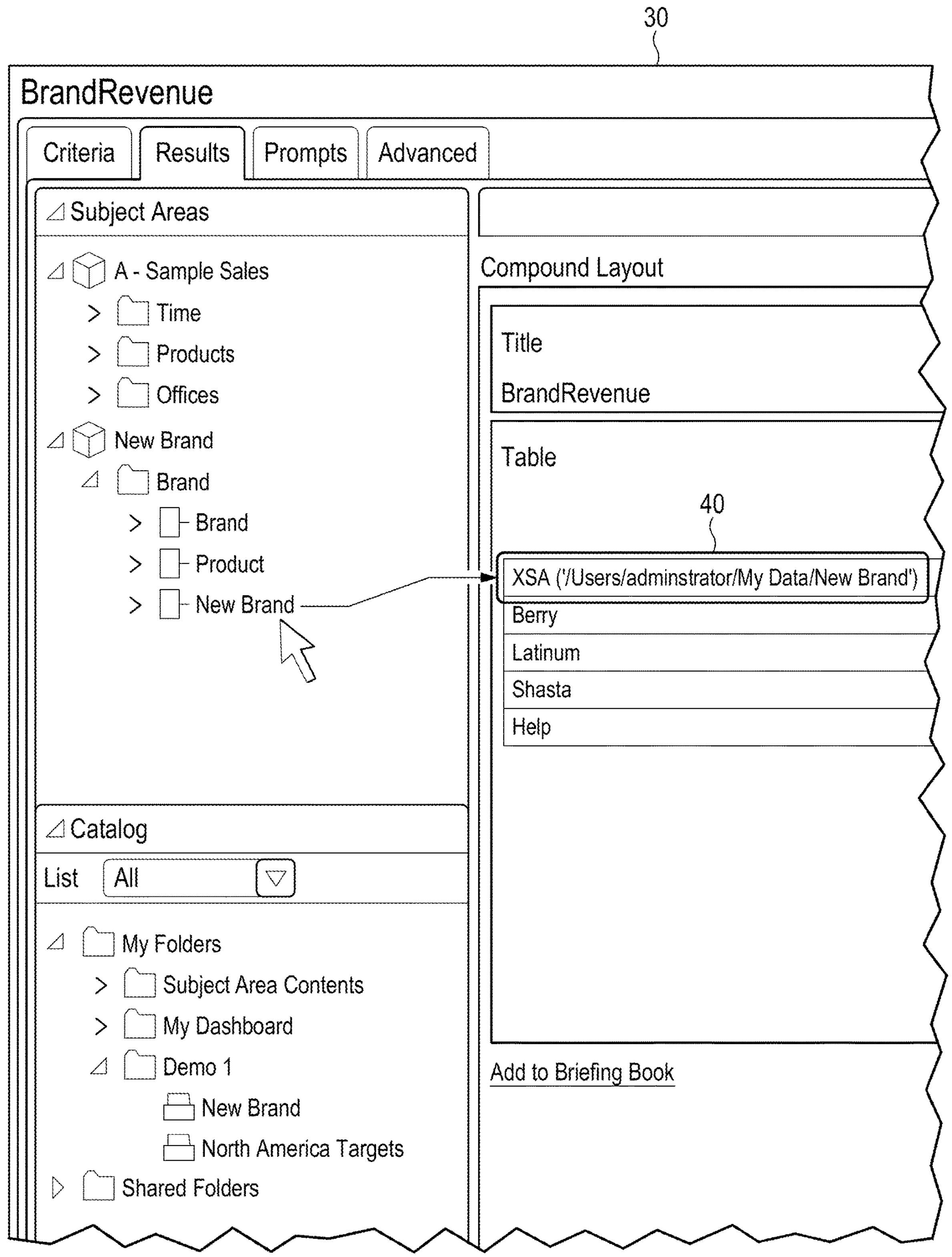
Figure 8:
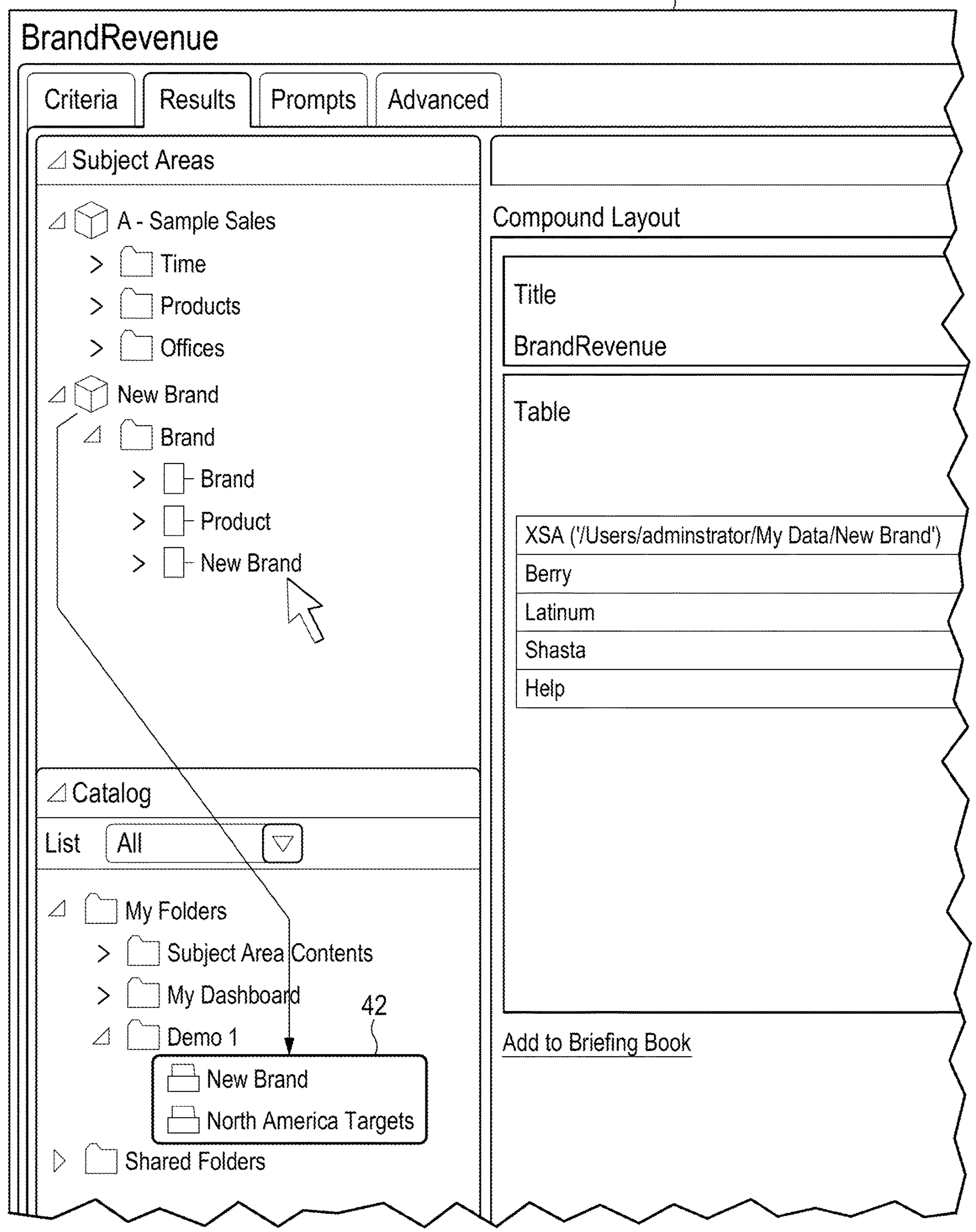

Once the external data is matched, it can be conformed to the fixed data model to allow data from both portions of the model to be used with each other at 24 in FIG. 3. The user interface that allows the user to use the new information is shown in FIG. 6. The New Brand list 38 allows the use of the extended information not previously able to be used. The user interface with region 40 in FIG. 7 shows that the XSA columns are used like any other subject area columns FIG. 8 shows at 42 that they can be re-used with other data analyses outside the current one shown in FIG. 7. Finally, at 26 in FIG. 3 the external data is unioned with the system at 26. Each of these portions will be taken in turn.

In the XSA, during the matching and extending process, three types of columns can be introduced, in one embodiment. Conformed columns match dimensional column values available in the Subject Area. Non-conformed attribute columns add new dimensional values not found in the SA, such as a demographic description include zip codes. Non-conformed, aggregate columns add a new measure not found in the Subject Area, such as a sales target set by a person's supervisor.

Similar to the types of columns, two types of tables can be introduced, in one embodiment. Dimension extension tables have conformed columns to match existing dimension columns and attributes, and new, non-conformed columns added to a dimension table. A fact extension table includes matches of conformed columns to match with existing dimension columns, measures that are new as non-conformed columns added as aggregate measures, and attributes that are new as non-conformed columns added to a dimension table.

Once the XSA with its various column types and tables is added to the data model, queries may result in many different combinations of the data. In many of the below examples, four columns from the SA will be combined at least in part with a spreadsheet from the XSA. The columns for the SA are as follows:

| Customer Dim | Sales Fact | Product Dim | Calendar Dim |
|---|---|---|---|
| Customer Key | Customer Key | Product Key | Day Key |
| Region | Product Key | Product Family | Cal Year |
| Country | Day Key | Product Category | Cal Quarter |
| State | Invoice Ref | Product Type | Cal Month |
| City | Sales Rep Key | Product Name | Month Name |
| Zip | Units Sold (Σ) | Product Brand | Date |
| Customer Name | Revenue (Σ) | | |

These columns are all independent from each other.

The spreadsheet from the XSA is:

| Demography.xlsx |
|---|
| Zip |
| Age Group |
| Income Group |
| Skills Group |
| Education Group |
| Household Size |

In the above sets of columns, the Zip is a conformed column, as that exists in the SA column Customer Dim. In order for the XSA dimension table to be used for valid query results, the XSA conformed column set, the row's composite key that in this case is Zip, values must be unique in the XSA, and they must be available in the SA Presentation Layer. In the above example, the Zip in the Demography column of the XSA conforms to a leaf grain in the Customer Dim column of the SA. The elements of the column Customer Dim are hierarchical. As will be discussed below in more detail, one could have a spreadsheet that has a key such as Country that matches to the Country in Customer Dim. This is a higher grain in the column than the Zip leaf grain.

The remaining elements of the XSA column are non-conformed attributes. As can also be seen by the above, the Customer Key in the Customer Dim column matches the Customer Key in the Sales Fact column, as the Product Key in the Sales Fact column matches the Product Key in the Product Dim column, and the Day Key in the Sales Fact column matches the Day Key in the Calendar Dim column.

In a fact extension, the XSA fact table has certain characteristics that will allow for valid query results. The XSA conformed column set, the row's composite key, can be non-unique in the XSA. The column conformation can only be made to a dimension table, and at some level in the hierarchy the conformed column must unique. The conformed columns must be available to the SA presentation layer.

Using some of the same columns from the SA above, the discussion now shows a different external spreadsheet with different columns.

| Sales Rep Dim | Sales Fact | Product Dim | Calendar Dim |
|---|---|---|---|
| Sales Rep Key | Customer Key | Product Key | Day Key |
| Line of Business | Product Key | Product Family | Cal Year |
| Sales Group | Day Key | Product Category | Cal Quarter |
| Rep Name | Invoice Ref | Product Type | Cal Month |
| Salary | Sales Rep Key | Product Name | Month Name |
| | Units Sold (Σ) | Product Brand | Date |
| | Revenue (Σ) | | |

| Targets.xlsx |
|---|
| Prod Category |
| Cal Quarter |
| Sales Rep Key |
| Threshold |
| Comsn Pcnt |
| Rev Target (Σ) |

The Sales Rep Key of the spreadsheet is a conformed column with the Sales Rep Key in Sales Fact and Sales Rep Dim. The Product Key and the 2Day Key from Sales Fact match with the same keys in Product Dim and Calendar Dim, respectively. The Product Cat from the spreadsheet conforms to the Product Category in Product Dim and the Cal Quarter from the spreadsheet matches the same from Calendar Dim. The Threshold and Comsn Pcnt from the spreadsheet are non-conformed attributes. And the Rev Target is an XSA aggregate measure.

Similarly, one can have both a dimension and a fact extension. Using columns from above, and two spreadsheets in the XSA, Demography.xlsx from above and Mkt Data.xlsx, one can see an example of this. Note that the two spreadsheets appear to be columns but are actually separate spreadsheets.

| Customer Dim | Sales Fact | Product Dim | Calendar Dim |
|---|---|---|---|
| Customer Key | Customer Key | Product Key | Day Key |
| Region | Product Key | Product Family | Cal Year |
| Country | Day Key | Product Category | Cal Quarter |
| State | Invoice Ref | Product Type | Cal Month |
| City | Sales Rep Key | Product Name | Month Name |
| Zip | Units Sold (Σ) | Product Brand | Date |
| Customer Name | Revenue (Σ) | | |

| Demography.xlsx | MktData.xlsx |
|---|---|
| Zip | Prod Fam |
| Age Group | Cal Quarter |
| Income Group | Zip |
| Skills Group | Media Class |
| Education Group | Media Type |
| Household Size | Vendor |
| | Rev (Σ) |

Again, the Zip in the Demography spreadsheet is a conformed column, and in the Mket Data spreadsheet as well, as they conform to the Zip in Customer Dim. In addition, the Prod Fam and Cal Quarter columns in the Mket Data spreadsheet match the Product Dim column and the Calendar Dim column, respectively. The Media Class, Media Type and Vendor in Mket Data are non-conformed attributes and the Rev is an XSA aggregate measure.

Having seen the various combinations of information from the SA and the XSA, one can see the results of various queries. FIG. 9-11 shows examples of queries in which there has been a dimension extension in the XSA. Generally, the system will perform a join between the SA and the XSA portions relevant to the query, extract the desired data and then display or otherwise report it to the user. The resulting answer and the query may then be stored for later access.

FIG. 9 shows a query result from a dimension extension in which 2 zip codes do not exist in the databased, or fixed data model, subject area. This uses the XSA dimension table only. In FIG. 9, the query result shows 2 zip codes, for Brooklyn and Santa Barbara that do not exist in the SA. Without the use of the XSA, the information for this zip codes would not be accessible by the end user.

FIG. 10 shows a dimension extension in which the SA dimension table and the XSA dimension table results are shown in a full outer join. The information from the SA is shown in window 46 and the information from the XSA in window 46. As can be seen here, the gray area 50 shows null SA attributes. The XSA displays the information for those two zip codes from FIG. 9, but there is no matching cities in the SA. One should note that the use of the term 'window' merely differentiates between the sources of the data displayed to the user. The data appears in the columns as shown, but with no differentiation indicating their source.

FIG. 11 shows a query result in which the columns from the SA dimension table and the XSA dimension table are joined in a left outer join to fact. The windows 52 display the information from the SA and the window 54 shows the information from the XSA. The group of columns 56 are conformed columns and will return the same values. One should note that there are no null SA measures as shown in the right SA window 52.

Other situations may also arise. In FIG. 12, the results of a query include 8 countries, such as South Africa 58, that do not exist in the fixed model SA, only in the XSA. When the two portions combine in a full outer join to answer a query, FIG. 13 shows the results. In the SA window 60, there is a null attributes area 64, while the countries that exist in the XSA 66 show up in the XSA window 62. Similarly, FIG. 14 shows null attributes 72 in the SA dimension table window 68 for Portugal 74 that showed in the XSA only query above. New Zealand and Mexico exist in the SA, but not the XSA, so now the XSA window 70 has null attributes 76. This resulted from a full outer join.

In FIG. 15, both the SA 80 and the XSA 78 include a country column, which conform as 82, each returning the same value. No null attributes exist for either the SA or the XSA. This resulted from columns from the SA fact table, the SA dimension table and the XSA dimension table, a left outer join to fact.

As shown above, the XSA dimension in FIG. 14 includes Portugal, but the SA dimension table does not, and the SA dimension table includes New Zealand and Mexico, but the XSA does not. FIG. 16 shows a query resulting from a mix set of SA dimension table, SA fact and XSA dimension table left outer join to fact. The resulting report shows no null SA attributes in either 86 or 80, but null attributes 92 in XSA 88.

In summary of these types of queries, an XSA dimension can have a 1:1 or a 1:M relationship with the SA dimension to which it conforms. A left outer join is performed between facts and dimensions. All fact values and only those dimension values that correspond end up in the result. A full outer join is performed between dimensions and dimensions, where null SA or XSA dimension values can appear.

The discussion now turns to fact extensions, discussed above with regard to the requirements. In FIG. 17, the resulting response comes from columns from XSA fact table at 98 and 100, and SA fact table and SA dimension at 94 and 96. The resulting calculation Variance at 102 comes from both SA and XSA measures.

FIG. 18 shows a different situation. This results from a combination of XSA fact, SA fact and SA dimensions. No null attributes for either the SA or the XSA exist in columns 104 or 106 within the window 112. However, the 'empty' spaces exist, but represent no targets or no sales rather than null values. For example, the regions 114 in column 108 represent no sales made for the sales rep Nina Swartz, who had targets present in column 110. Similarly, no target exists in column 110 for Fernando Rio to sell music, but he had sales, resulting in the empty spot 118. This combination results from a left outer join to both fact tables.

In fact extensions, one may have a dense data supplement in which full responses or data exist and the data can be correlated with a number of dimensions. FIG. 19 shows a result from XSA fact, SA fact and SA dimension. Groups 118, 122 and 126 come from the SA and 120 and 124 come from the XSA. This demonstrates how many different dimensions can be analyzed when the data is dense.

Figure 20:
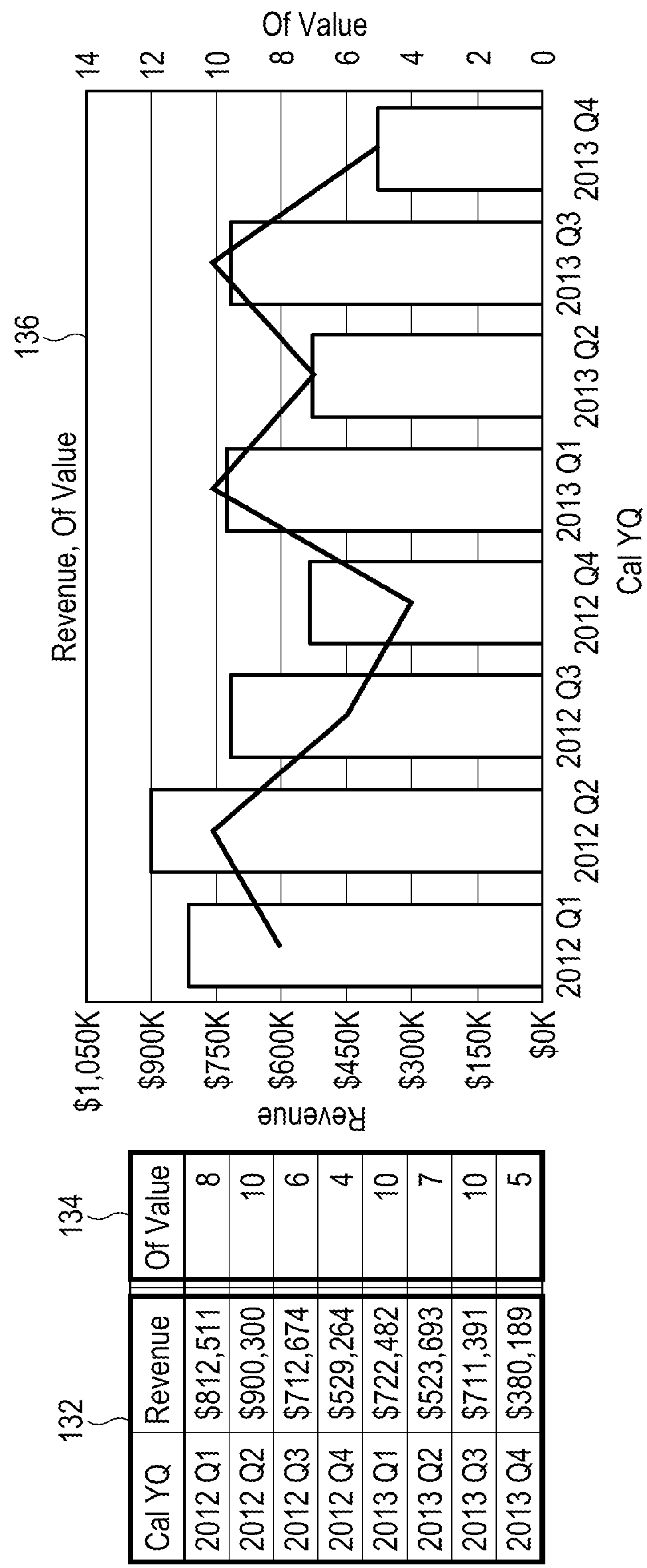

In contrast, a sparse data supplement means that the XSA fact table has minimal data and the responses do not include all of the data points. For example, a survey asked for information that would have resulted in information about the day the customer bought a product, and whether or not the customer liked it, would promote it to others and whether it was of value. The only responses were to whether or not it was of value. The SA had information as to the sales year and revenues, shown at 132 in FIG. 20, and the responses showed whether or not it was of value from the XSA at 134. The system can also present this information as a graph 136.

In this manner, users can upload external data to a data model and use it in conjunction with a fixed data model portion to run analyses, reports and to answer queries. Having discussed the various types of joins, dimension and fact extensions, the discussion now turns to the implementation of how to perform such tasks.

One embodiment of the invention includes a funnel process in which mash-up and existing data are feed in at the top of the funnel and through a series of queries and/or filters, the desired answer comes out at the bottom of the funnel, which may be in the form of, e.g. a table or chart. In one example, the end-user can create mashup data by uploading an Excel file and associate it with elements of an existing model. The Excel file and the appropriate columns of the Excel file can then be used to formulate reports, analyses, and dashboards.

In one embodiment once a data mashup file is loaded into the storage repository, it is available for authoring and display within analyses and dashboards. BI Answers/Dashboards know the name of the data mashup file and the column names. Datatypes and other metadata are exposed in Answers in the same way as with current BI metadata. Oracle Business Intelligence System (OBIS) will be responsible for interpretation of the metadata. As a simple example assume the existing BI Model contains Sales information including 'Product' and 'Actuals'. A data mashup file is uploaded and stored in the catalog that contains 'Product' and 'Target' information. To get as an output a report that is a simple table with 'Product', 'Actuals', 'Target' may result in something similar in substance to the following example query being generated automatically:

```
SELECT
    0 s_0,
    "RaaS"."SAMP_PRODUCTS_D"."PROD_DSC" s_1,
    "RaaS"."SAMP_REVENUE_F"."REVENUE" s_2,
    "XSA('JohnDoe'.'MyDataMashup')"."DATA"."TARGET_REVENUE" s_3
FROM "RaaS"
ORDER BY 1, 2 ASC NULLS LAST
FETCH FIRST 65001 ROWS ONLY
```

In this example, Oracle BI Server will interpret the above. When it evaluates the Mashup Expression above, it will query Oracle Business Intelligence Presentation Server (BIPS) for the data types, relationships, and data appropriately to be able to evaluate the above query.

In another embodiment, the following steps may be performed: a data loader will load up the mashed-up data. BIPS will generate the appropriate metadata file. BIPS will issue appropriate queries for simple reports, passing the appropriate SQL syntax to OBIS. BIPS will need to retrieve the metadata as well. OBIS will query BIPS for data and metadata locations, interpret the results and perform the queries.

An example of Fact Mashup Query Generation is given for the case of all attributes in a mashup. This case may be treated as a simple sub-request and all attributes may be automatically rendered onto the mashup subrequest. For example, if the XSA is (CustomerAddress, Quota), then the query:

```
    Select SA.CustomerAddress, SA.Sales, XSA.quote from SA, XSA
    Is automatically rendered as:
    Select * from
    (select CustomerAddress, sum(sales) from SA.fact f, SA.dim d where
f.cust_id=d.cust_id group by CustomerAddress)
    FOJ
    (select CustomerAddress, sum(quote) from XSA group by
    CustomerAddress)
```

Note:
FOJ is full outer join

An example of Dimension Mashups Query Generation is given for dimension only queries. If the curated side has a dimension Customer with a key of CustId and Attributes Name, Address and Zip, and an excel is uploaded which has the following:
(CustId(conformed), Name (conformed), Marital Status).
And if the query is:
Select SA.CustID, SA.Address, XSA.MaritalStatus from SA, XSA
Then the following physical query is automatically rendered:

```
        Select nvl(A.CustID, B.CustID), Address, MaritalStatus
        (Select SA.custID, SA.Address from SA) A
         FOJ
    (Select SA.custID, SA.MaritalStatus from XSA) B
```

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the embodiments here.

What is claimed is:

1. A computer-implemented method comprising:
providing a data model having at least one fixed subject area and at least one extended subject area, the fixed subject area having at least one data source;
uploading at least one external file having data external to the at least one data source to the at least one extended subject area of the data model;
matching at least some parts of the at least one external file to the at least one fixed subject area of the data model;
conforming the matched parts of the at least one external file to the at least one fixed subject area of the data model, and storing the conformed parts to an extension table for future use; and
allowing a user to use data from both the at least one fixed subject area and the at least one extended subject area of the data model together.

2. The computer-implemented method of claim 1, wherein providing a data model comprises providing at least one table from at least one database.

3. The computer-implemented method of claim 1, wherein uploading the at least one external file comprises loading at least one spreadsheet file.

4. The computer-implemented method of claim 3, wherein loading at least one spreadsheet file comprises one selected from the group consisting of: uploading a file, replacing a file, editing metadata for a file, appending a file, and catalog management operations.

5. The computer-implemented method of claim 1, wherein matching at least some parts of the at least one external file comprises matching columns.

6. The computer-implemented method of claim 5, wherein matching columns comprises matching at least one column selected from the group consisting of: a conformal column; a non-conformed non-aggregated column; and a non-conformed, aggregated column.

7. A computer-implemented method, comprising:
receiving a query from a user to a data model that includes a stored subject area portion having at least one data source and a stored extended subject area portion having at least one data source external to the subject area portion;
accessing at least one storage to retrieve the subject area portion and the extended subject area portion;
joining relevant portions of the subject area and extended subject area and storing the joined portions for future use;
extracting answers to the query from the joined portions; and
reporting the answers to the user.

8. The computer-implemented method of claim 7, wherein joining the relevant portions of the subject area and the extended subject area comprises joining a subject area dimension table with an extended subject area dimension table.

9. The computer-implemented method of claim 8, wherein joining a subject area dimension table with an extended subject area dimension table comprises a full outer join.

10. The computer-implemented method of claim 7, wherein joining the relevant portions of the subject area and the extended subject area comprises joining a subject area dimension table with an extended subject area dimension table and a subject area fact table.

11. The computer-implemented method of claim 7, wherein joining the relevant portions of the subject area and the extended subject area comprises joining a subject area fact table with an extended subject area fact table.

12. The computer-implemented method of claim 7, wherein joining the relevant portions of the subject area and the extended subject area comprises joining a subject area fact table with an extended subject area fact table and a subject area dimension table.

13. A computer-implemented method comprising:

providing at least one database as a fixed portion of a data model;

uploading at least one spreadsheet having columns as an extended portion of the data model separate from the fixed portion;

matching at least some of the columns in the at least one spreadsheet to columns in the database;

conforming the matched columns to the fixed portion of the data model creating a dimension extension, and storing the dimension extension to an extension table for future use;

allowing a user to use data in the database columns and the spreadsheet columns to answer queries.

14. The computer-implemented method of claim 13, wherein providing at least one database comprises providing at least one table from at least one database.

15. The computer-implemented method of claim 13, wherein matching at least some of the columns in the at least one spreadsheet comprises using the columns in the spreadsheet as keys.

16. The computer-implemented method of claim 13, wherein matching columns comprises at least one of conformal column; non-conformed non-aggregated column; and non-conformed, aggregated column.

* * * * *